US010033174B2

(12) United States Patent
Emerson et al.

(10) Patent No.: US 10,033,174 B2
(45) Date of Patent: Jul. 24, 2018

(54) SYSTEM FOR CONTINUOUS ELECTRICAL WELL CABLE FEED-THROUGH FOR A WELLHEAD AND METHOD OF INSTALLATION

(75) Inventors: Tod D. Emerson, Cypress, TX (US); Leroy Cantu, Manvel, TX (US); Jerry L. Reeves, Houston, TX (US); Michael Daugherty, Houston, TX (US)

(73) Assignee: Quick Connectors, Inc., Houston, TX (US)

( * ) Notice: Subject to any disclaimer, the term of this patent is extended or adjusted under 35 U.S.C. 154(b) by 479 days.

(21) Appl. No.: 14/125,000

(22) PCT Filed: Jun. 8, 2012

(86) PCT No.: PCT/US2012/041669
§ 371 (c)(1),
(2), (4) Date: Dec. 9, 2013

(87) PCT Pub. No.: WO2012/170894
PCT Pub. Date: Dec. 13, 2012

(65) Prior Publication Data
US 2014/0110164 A1 Apr. 24, 2014

Related U.S. Application Data

(60) Provisional application No. 61/495,625, filed on Jun. 10, 2011.

(51) Int. Cl.
*H02G 3/22* (2006.01)
*E21B 33/04* (2006.01)

(52) U.S. Cl.
CPC .......... *H02G 3/22* (2013.01); *E21B 33/0407* (2013.01); *Y10T 29/49826* (2015.01)

(58) Field of Classification Search
USPC ............................ 166/380; 174/667; 29/428
See application file for complete search history.

(56) References Cited

U.S. PATENT DOCUMENTS

| 5,289,882 | A | | 3/1994 | Moore | |
|---|---|---|---|---|---|
| 5,522,872 | A | * | 6/1996 | Hoff | A61N 1/056 600/396 |
| 5,762,135 | A | * | 6/1998 | Moore | E21B 17/003 166/379 |
| 5,823,256 | A | * | 10/1998 | Moore | E21B 17/003 166/65.1 |
| 6,409,102 | B1 | | 6/2002 | Luttrell | |
| 2008/0185155 | A1 | * | 8/2008 | Emerson | H01R 13/523 166/378 |
| 2010/0326725 | A1 | | 12/2010 | Emerson | |

* cited by examiner

*Primary Examiner* — Taras P Bemko
(74) *Attorney, Agent, or Firm* — David B. Dickinson

(57) ABSTRACT

An epoxy sealant confined around a transition seal body system for a down hole electric cable transition from a protected cable to separate conductors of a three-phase electrical service provides a vapor and pressure seal, preventing premature failure from temperature and pressure changes in the wellbore. The use of epoxy to completely surround the transition seal body within the penetrator mandrel permits field installation of continuous electrical conductors from a wellbore through a pressure sealing wellhead to the surface.

5 Claims, 7 Drawing Sheets

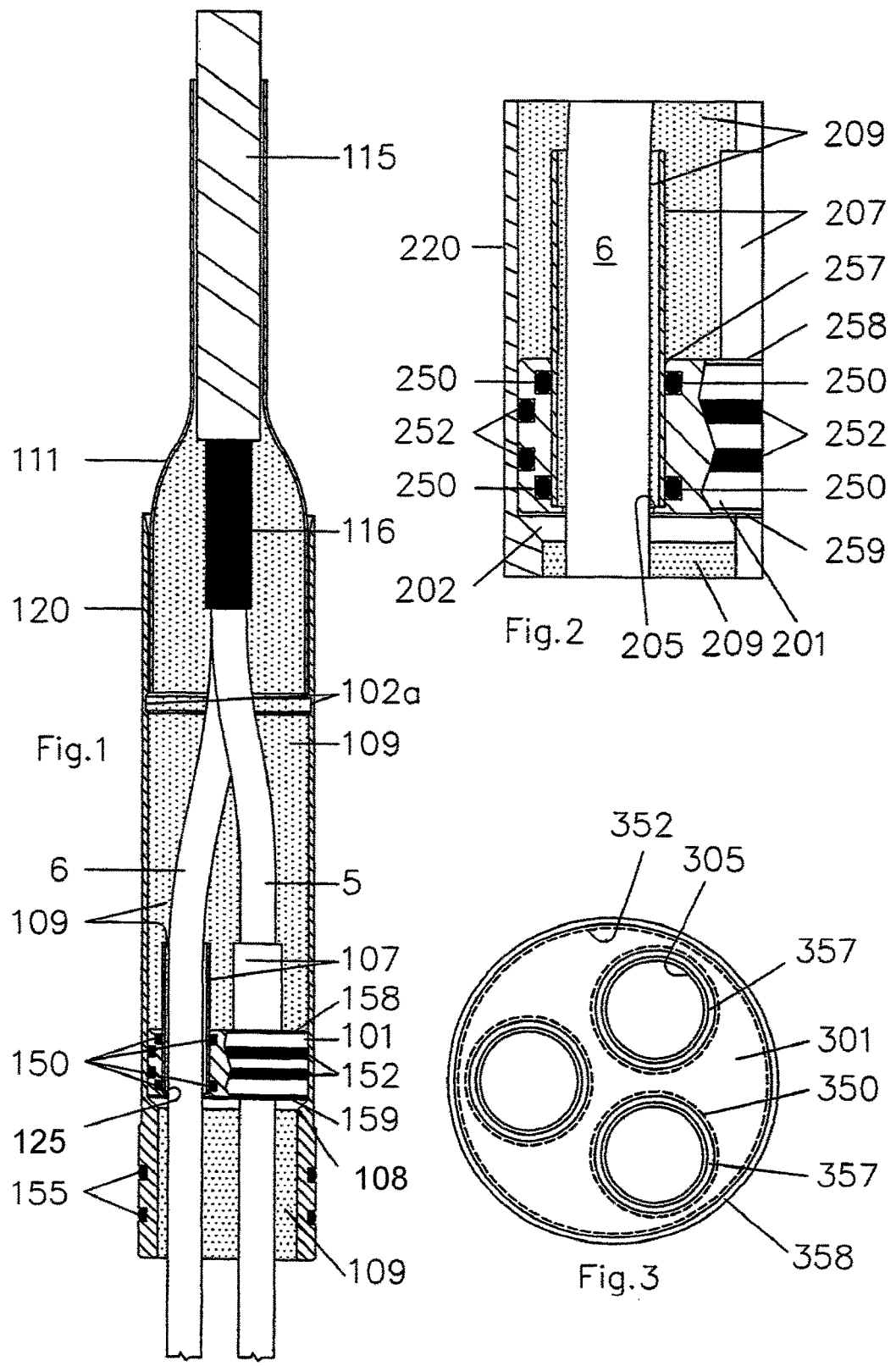

SYSTEM FOR CONTINUOUS ELECTRICAL WELL CABLE FEED-THROUGH FOR A WELLHEAD AND METHOD OF INSTALLATION

This application claims priority to U.S. Provisional Application No. 61/495,625 filed 10 Jun. 2011, and PCT/US2012/041669, filed 8 Jun. 2012, which are incorporated herein by reference.

BACKGROUND OF INVENTION

Field of Invention

The present application relates to a new and improved method of sealing a continuous electrical cable through a wellhead for providing electrical power to an underground use of such power, such as an electrical submersible pump or a heating system. Specifically, applicants claim a wellhead penetrator system that seals against excessive pressure and high temperatures and thereby maintains electrical integrity on a electrical cable system, specifically on an ESP cable, which runs continuous through a surface wellhead or other device, using a combination of elastomeric seals and epoxy seals as the primary sealing agents.

Description of Related Art

Electrical cable transitions and seals have for many years been installed in well bores to provide power to electrical submersible pumps or other down-hole equipment. This equipment utilizes three-phase electrical conductors that penetrate a surface wellhead, which is intended to seal the well to prevent the release of dangerous or explosive vapors into the wellhead area on the surface.

Penetrator systems as above are described in U.S. Pat. Nos. 5,762,135, and 5,289,882. Various arrangements have improved the reliability of these penetrator systems and very often they would use epoxy to seal the end of the electrical conductors in order to protect the insulation on each conductor from encroachment from hydrocarbon vapors which cause the conductor's protective elastomeric coverings to swell or crack and thereby cause the high voltage, high amperage wires to short out with catastrophic results. The physical integrity of the connections heretofore principally relied upon the mechanical cooperation of sleeves, compression fittings, and non-ferromagnetic covers to prevent the ingress of hydrocarbon vapors into the connection for the preservation of the connection. After many years of experimentation and use of existing technology, applicants have discovered that the use of field-mixed epoxy can provide both a seal for the conductors which are protected on the interior of the penetrator system and also a bonded surface which prevents further movement of the conductors within the penetrator, thereby assuring long-lasting serviceability of the penetrator and the continuous conduit extending therethrough.

The present application seeks to claim a plurality of novel and improved means for a continuous electrical cable feed-through which permits electrical conductors to be sealed sufficiently to protect the conductors from ingress of damaging vapors within the well bore and thereby preventing premature failure by short-circuiting and the like, while also preventing pressure loss through the wellhead.

SUMMARY OF INVENTION

This system for a continuous electrical well cable feed-through for a wellhead comprises a non-ferromagnetic mandrel insertable in a wellhead providing a longitudinal passage therethrough and providing an interior shoulder adjacent a first end of said mandrel; a non-ferromagnetic transition seal body, providing at least three foramen permitting passage of a non-terminated electrical conductor through each foramen, inserted into the longitudinal passage of the mandrel seated against the interior shoulder adjacent the first end of said mandrel; and, epoxy packed around each non-terminated electrical conductor on both sides of the non-ferromagnetic transition seal body within the mandrel.

This system for a continuous electrical well cable feed-through for a wellhead can provide each foramen of the non-ferromagnetic transition seal body with chamfered edges and can further provide a non-ferromagnetic transition seal body with an interior shoulder within each of the foramen permitting at least three steel tubes for supporting the non-terminated electrical conductors inserted into the non-ferromagnetic transition seal body, where each steel tube seated on the interior shoulder in the transition seal body. The epoxy packed around each non-terminated electrical conductor on both sides of the non-ferromagnetic transition seal body within the mandrel fills the non-ferromagnetic mandrel and at least a portion of the electrical conductor within the steel tubes.

This system can also further comprise an elastomeric seal member providing a plurality of passages permitting the introduction of the electrical conductors and the steel tubes covering said electrical conductors, while additionally permitting the opening on the transition seal body to be chamfered to permit insertion of the steel tubes into the body for seating against the interior shoulder of the non-ferromagnetic transition seal body.

One method for installation of a continuous electrical three-phase cable through a wellhead may be described as stripping a protective outer sheath down to the insulation on an electrical conductor of a down-hole three-phase electrical cable; inserting an electrical conductor into each foramen on a non-ferromagnetic transition seal body; seating the end of the non-ferromagnetic transition seal body against an interior shoulder of a non-ferromagnetic mandrel; distributing epoxy around the insulated electrical conductors on both sides of the non-ferromagnetic transition seal body within the non-ferromagnetic mandrel completely filling the interior of the mandrel; and, inserting the mandrel into a wellhead hanger supported in the wellhead.

Alternatively, this method for installation of a continuous electrical three-phase cable through a wellhead can comprise the steps of removing the protective outer sheath from a down-hole three-phase electrical cable; removing a portion of the lead sheath from around each electrical conductor exposing the conductor and its insulation; inserting each of the insulated electrical conductors into a non-ferromagnetic tubing; inserting each non-ferromagnetic tubing into a non-ferromagnetic transition seal body seating the end of each non-ferromagnetic tubing against an interior shoulder in said non-ferromagnetic transition seal body; distributing epoxy evenly around the electrical conductors covering the exposed end of the lead sheath and the protective outer sheath of the electrical three-phase cable; enclosing the non-ferromagnetic transition seal body and epoxy covered electrical conductors within an epoxy-filled protective mandrel; inserting the mandrel into the wellhead; and, sealing the upper end of the mandrel in the wellhead with epoxy.

This method for installation of a continuous electrical three-phase cable through a wellhead can further comprise the steps of inserting each non-ferromagnetic tubing into an elastomeric seal providing a plurality of passages for the electrical conductors and the tubing; distributing epoxy between the elastomeric seal and the non-ferromagnetic transition seal body prior to insertion of the transition seal body within the mandrel.

BRIEF DESCRIPTION OF THE DRAWINGS

FIG. 1 is a partial cross-sectional view of an embodiment showing a transition seal of the electrical cables from a pump cable through the seal.

FIG. 2 is a more detailed view of the transition seal of FIG. 1 showing the seal fixed in the interior of the mandrel for enclosing the epoxy sealant.

FIG. 3 is cross-sectional view of the transition seal body.

DETAILED DESCRIPTION OF THE EMBODIMENTS

Figure 4:
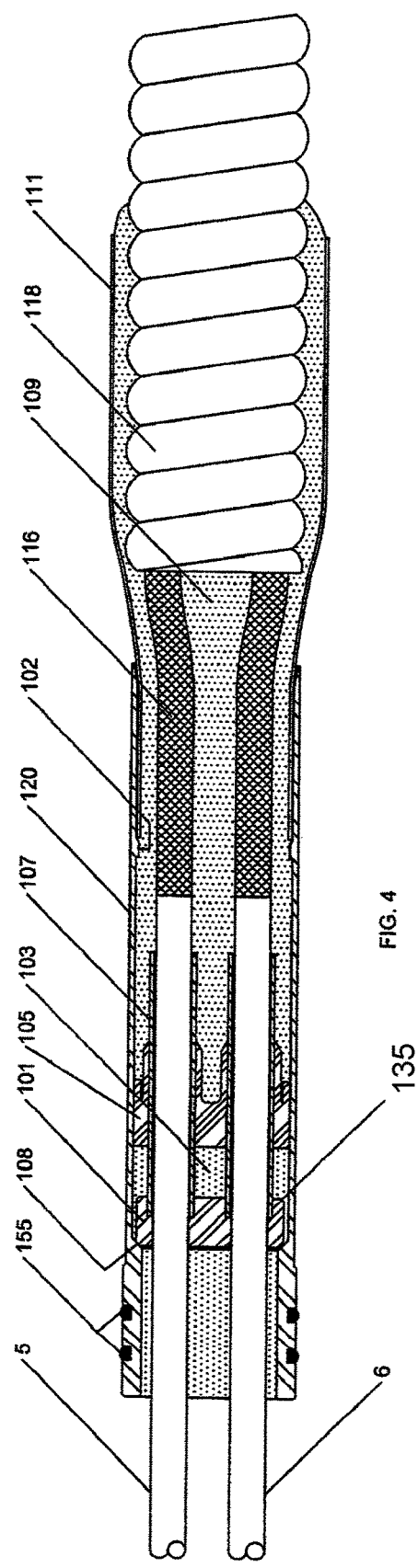
FIG. 4 is a cross-sectional view of another embodiment of the continuous flat-electrical cable through a penetrator sleeve for insertion in a wellhead hanger.

As previously noted, users have long sought secure seals for down-hole electrical conductors experiencing high pressures and temperature. Applicants have discovered that secure, safe, vapor resistant, and field-installable seals providing high temperature and high-pressure protection for electrical conductors in transition from the well bore to the surface through the wellhead can be established using epoxy in conjunction with a transition seal body seated within the penetrator mandrel.

FIG. 1 is the proposed transition seal showing a non-ferromagnetic seal body 101 made from a nickel coated brass or stainless steel, which is intended to seat in a wellhead or tubing hanger (not shown), all in a manner previously well known to those skilled in this art. The seal body 101 provides an interior shoulder 125 against which is seated a non-ferromagnetic tubing 107 in each hole, which tubing, in this case, is fabricated from stainless steel.

Armored pump cable 115 is inserted in a non-ferromagnetic transition collar 111 and the electrical cables are separated from their twisted relationship. In this view, a lead jacket sheath 116 often found around the individual conductors is also stripped from the insulated covering of the individual conductors 5, 6 upon insertion into the non-ferromagnetic penetrator mandrel 120 and into the stainless steel tubes 107 as previously discussed, leaving only the elastomeric covering on each conductor 5, 6. This covering is normally made from ethylene propylene diene monomer rubber (EPDM). The transition collar 111 is inserted to be restrained by a groove 102a and epoxy 109 on the interior surface of the penetrator mandrel 120.

As is well known, these non-ferromagnetic materials do not conduct the eddy currents associated with the electrical current found in each of the separated three-phase electrical conductors. A quantity of epoxy 109 is installed between the transition seal body 101 and a penetrator mandrel 120 enclosing each of the separated conductors 5, 6. The tubes 107 seating within the transition seal body 101 segregate and hold each leg of the electrical conductors in a fixed, but separate, position allowing the epoxy 109 to set and harden around the conductors 5, 6, the tubes 107 and the interior wall of the penetrator mandrel 120. A flat-to-round transition collar could be substituted for the transition collar 111, permitting either the flat or round form of power cable to be used with this transition. The transition collar 111, typically formed from stainless steel, provides the means for starting the separation of the electrical conductors 5,6 and covers a large portion of epoxy 109 as it is inserted into the penetrator mandrel 120 where it seats on a mandrel groove 102a. While only two electrical conductors 5, 6 are shown in FIG. 1, a person having ordinary skill in this art will understand that most power cables are three-phase triple cables and the third conductor is not shown in this view.

As shown in FIG. 1, epoxy 109 fills the interior of the penetrator mandrel 120 and transition collar 111. The epoxy also enters each of the tubes 107 creating a seal around each electrical conductor 5, 6. The penetrator mandrel 120 is inserted in a wellhead where it seals with O-rings 155, all in a manner well known in this art. Additionally, epoxy 109 can also be installed and activated to seat on an opposite side of the transition seal body to more effectively isolate the seal 101 within the penetrator mandrel 120. FIG. 2 shows in more detail the transition seal body 101 of FIG. 1.

Viewing FIG. 2, one can see the transition seal body 201 providing a chamfered edge 259 on the lower edge of the seal body 201 and a chamfered edge 258 on the upper outer edge of the seal body 201. These chamfered edges allow the body 201 to be inserted easily into the interior of the penetrator mandrel 220. O-rings 252 retained in grooves and extending from the outer circumferential surface of the seal body 201 seal within the penetrator body 220. Each steel tube 207 is inserted in the seal body 201 where each seals in a second set of interior O-rings 250, where each tube seats against the interior shoulder 205. Epoxy 209 is inserted into the mandrel 220 where it surrounds each tube 207 and enters the space between the tubes 207 and the exterior surface of the electrical conductor inserted into the tube. This epoxy 209 seals each conductor 5, 6 within the transition seal body 201 and minimizes failures from high temperature and high pressure. Tests on this embodiment indicate this seal will maintain the seal up to 325° F. (163° C.) and about 4500 psi (31.02640 MPa). Other tests suggest that a similar embodiment can provide a seal 460° F. (238° C.) and about 6000 psi (41.36854 MPa).

FIG. 3 is a face view of the present transition seal body 301 showing the three holes or passages or foramen for the electrical conductors. Outer diameter 358 provides at least two grooves 352 into which are seated O-rings which sealingly engage the inner diameter of the penetrator mandrel (not shown in this view). Each tube passage ends on a lower shoulder 305 on the interior of each passage in tube body 301 permitting the tubes 207 shown in FIG. 2 to seat on said shoulder. Each passage provides a chamfered edge 357 allowing the insertion of each tube to seal against the O-ring installed inside the grooves 350.

The combination of the transition seal body, the O-rings sealing the stainless steel tubes in the body and the epoxy packing prevent the migration of damaging vapors and liquids and thereby prevents vapors from causing expansion and contraction damage to the electrical conductors and premature failure from arcing over to the companion conductor and short-circuiting the system at this vulnerable position in the electrical system in the well.

Figure 5:
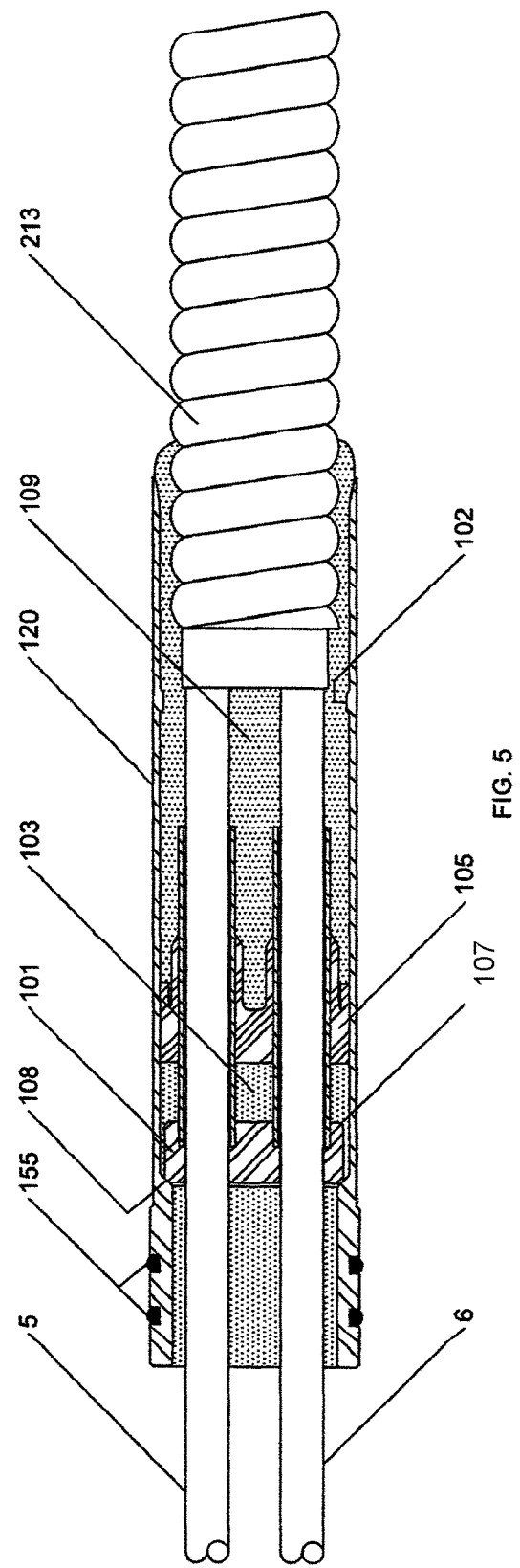
FIG. 5 is a cross-sectional view of another embodiment of the continuous round electrical cable through a penetrator sleeve for insertion in a wellhead hanger.
Figure 6:
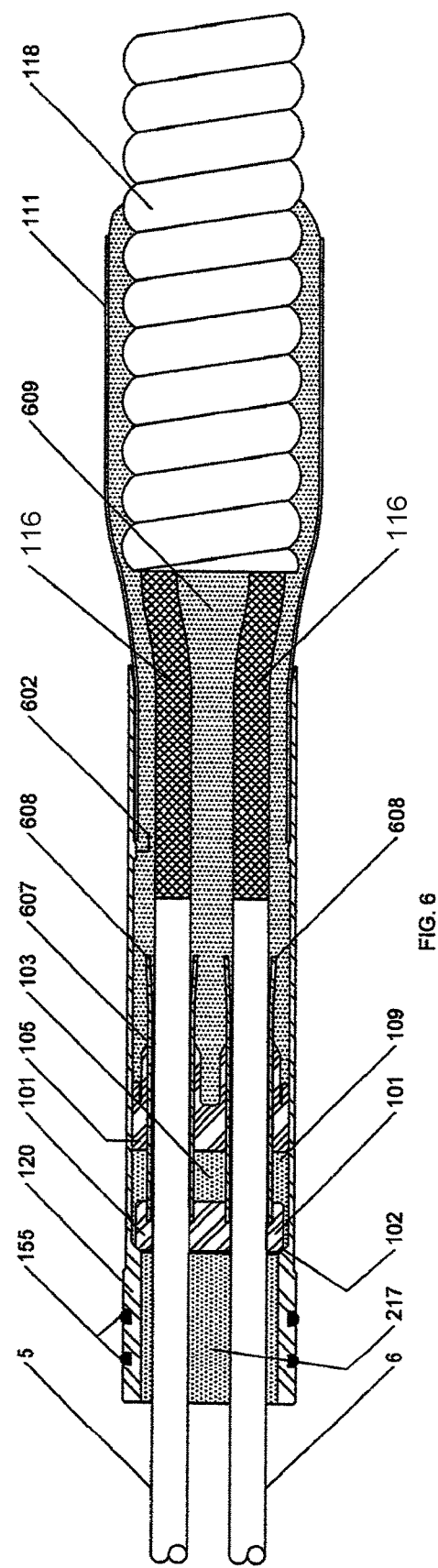
FIG. 6 is a cross-sectional view of another embodiment of the continuous flat-electrical cable through a penetrator sleeve for insertion in a wellhead hanger providing flared tubing guiding the cable through the mandrel.
Figure 7:
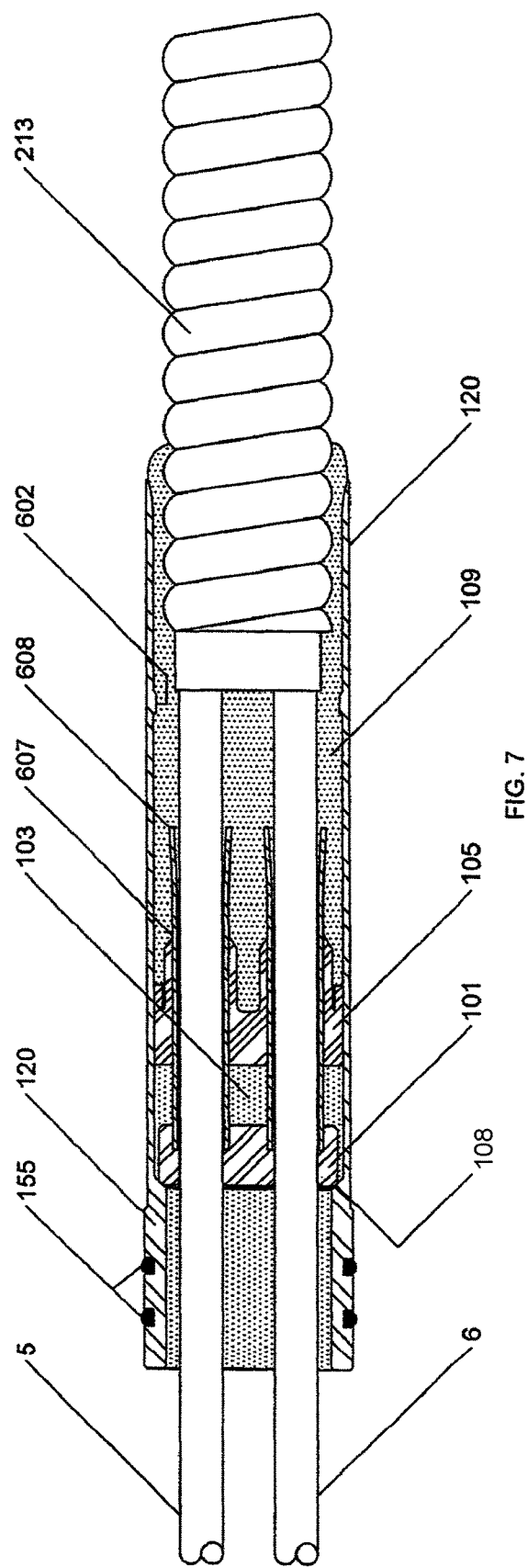
FIG. 7 is a cross-sectional view of another embodiment of the continuous round electrical cable through a penetrator sleeve for insertion in a wellhead hanger providing flared tubing guiding the cable through the mandrel.

As is well known, non-ferromagnetic materials, such as the stainless steel elements shown in FIGS. 4, 5, 6 and 7, do not conduct the eddy currents associated with the electrical current found in each of the separated three-phase electrical conductors. FIGS. 4 and 6 reflect a flat cable transition through a wellhead penetrator. FIGS. 5 and 7 reflect a round cable transition.

Starting with FIG. 4, a quantity of epoxy 103 is installed between a transition seal body 101 and an elastomeric seal 105 fashioned from ethylene propylene diene Monomer (M-class) rubber (EPDM), against which a larger portion of epoxy 109 is placed around each of the separated conductors 5, 6. This smaller portion of epoxy 103 is intended to only be about ¼-inch thick. The EPDM seal 105 segregates and holds each leg of the electrical conductors in a fixed, but separate, position allowing the epoxy 103, 109 to set and harden. The flat to round transition collar 111, typically formed from stainless steel, provides the means for starting the separation of the electrical conductors 5, 6 and covers the larger portion of epoxy 109. As previously discussed, flat protective outer sheath 118 shielded cable carries three electrical conductors (partially shown in this view as 116 providing protective lead covering on each insulated conductor) for conducting each phase of the electrical conductors. FIG. 5 is a round cable embodiment permitting an un-terminated and continuous insertion of the conductors 5, 6 from a round shield cable 213 to pass through a wellhead penetrator providing a mandrel 120 to be inserted into said body (not shown). Conductors 5, 6 are separated from the shield cable on an interior portion of the mandrel 120 and inserted in steel tubes 107 which are set within a transition seal body 101 retained on a shoulder 108 within the mandrel 120. Each conductor 5, 6 and tube 107 is inserted into an elastomeric seal as shown in FIG. 4 at 105. Each embodiment provides the identical arrangement of seal and tube arrangement.

FIG. 6 is another embodiment of the epoxy-filled transition seal for a continuous electrical cable flow-through, having the added feature of a bell 608 at the lower end of the tubing 607 to allow a slightly larger amount of epoxy 609 to encircle each of the electrical conductors. This epoxy 609 more securely seals the electrical conductors 5, 6, which have been stripped of their lead sheathing 116 leaving only the outer insulation around each conductor in the stainless steel tubing 607 which is seated within a non-ferromagnetic transition seal body 101 which in turn abuts an interior shoulder 135 formed on the inside of the transition seal body 101. During field installation, the electrical conductors 5, 6 are stripped out of the protective outer sheath 118 and the lead sheath 116 before encapsulating each conductor 5, 6 in the epoxy. Because it has been discovered that well vapor can enter the protective outer sheath 118 and be transmitted up the conductor, the lead sheath 116 and the protective outer sheath 118 are stripped at this point. If the protective outer sheath 118 is round as shown in FIG. 5, the end of the protective outer sheath 213 and the encapsulated electrical conductors 5, 6 are further stripped of their lead covering protective outer sheaths, if any, and are covered solely with epoxy 609. If the protective outer sheath 118 is a transition from a flat cable, such as shown in FIGS. 4 and 6, a non-ferromagnetic collar 111 is seated against an interior shoulder 102, as is more fully shown in FIGS. 4 and 6 to cover the encapsulating epoxy and conductors.

In this embodiment depicted in FIGS. 4-6, the transition seal body 101 seats within the penetrator mandrel 120 which provides grooves on its exterior surface for O-rings 155 to seal against the interior surface of the wellhead or cable hanger (not shown). Additional epoxy 217 is inserted in the interior of the wellhead or cable hanger to seal the mandrel 120, the transition seal body 101 and the electrical conductors 5, 6 in order to seal each end of the mandrel that is inserted into the wellhead penetrator (not shown). FIG. 7 is equivalent to FIG. 5 in every way, except it provides a belled stainless steel tube 608 to guide the conductors 5, 6 through the elastomeric seal 105 and the transition seal body 101.

Figure 8:
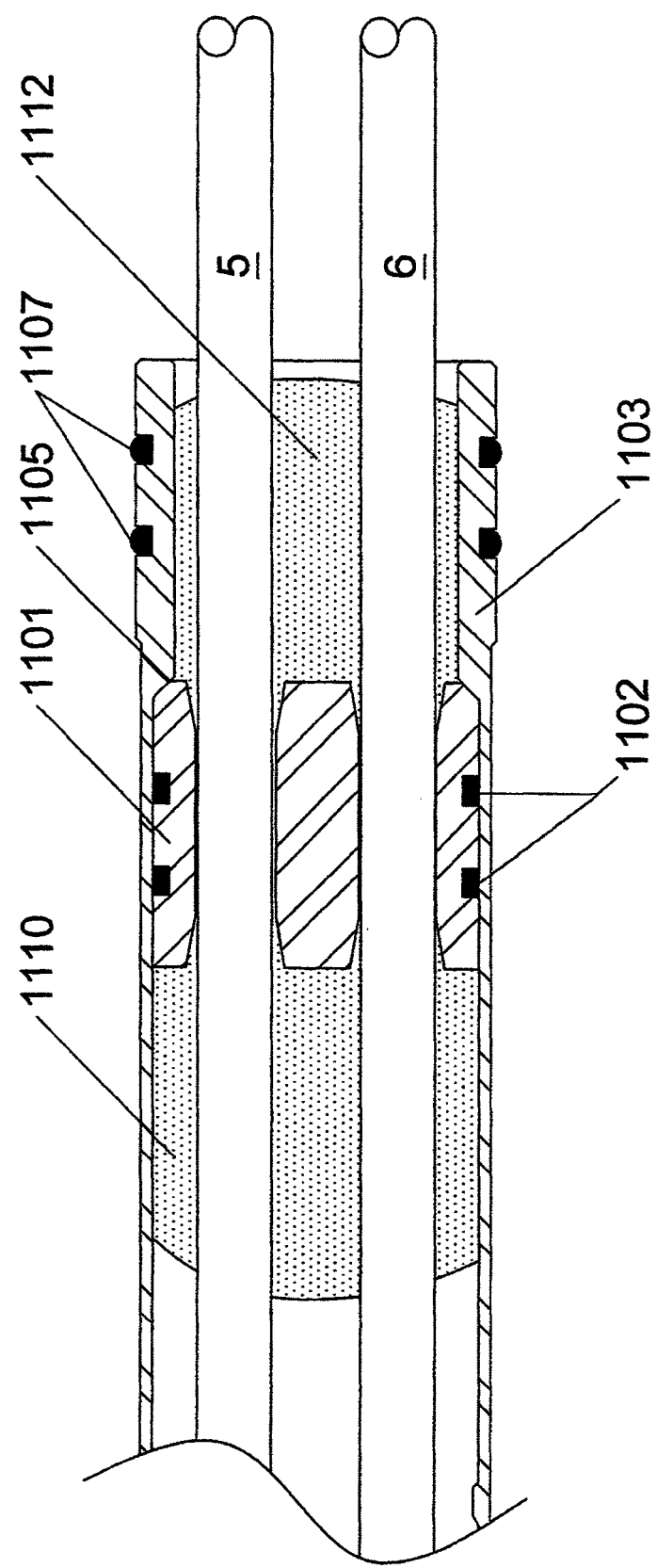
FIG. 8 is a cross-sectional view of another embodiment of the continuous round electrical cable through a penetrator sleeve for insertion in a wellhead hanger providing in a non-ferromagnetic transition collar in said penetrator tubing.

FIG. 8 is another embodiment of the epoxy sealing system of the present application. A unitary washer or transition seal assembly or body 1101 is inserted in a mandrel 1103 and seats against an upper shoulder 1105 formed in the interior surface of the mandrel 1103 and seals electrical conductors 5 and 6 through the transition seal assembly or body 1101 into the well-head or tubing hanger (not shown). Epoxy is inserted and seals the electrical conductors 5 and 6 in the interior 1110 of the mandrel 1103 and on the upper end 1112 of the mandrel 1103 thereby sealing the electrical conductors 5 and 6 guided through the transition seal assembly or body 1101 from pressure variations and vapors, which can cause failure of the electrical cables. O-rings 1102 on the exterior of the transition seal body 1101 seal the body on the interior of the mandrel body 1103, and O-rings 1107 on the exterior surface of the mandrel body seal the body 1103 to the tubing hanger or wellhead (not shown.)

Figure 9:
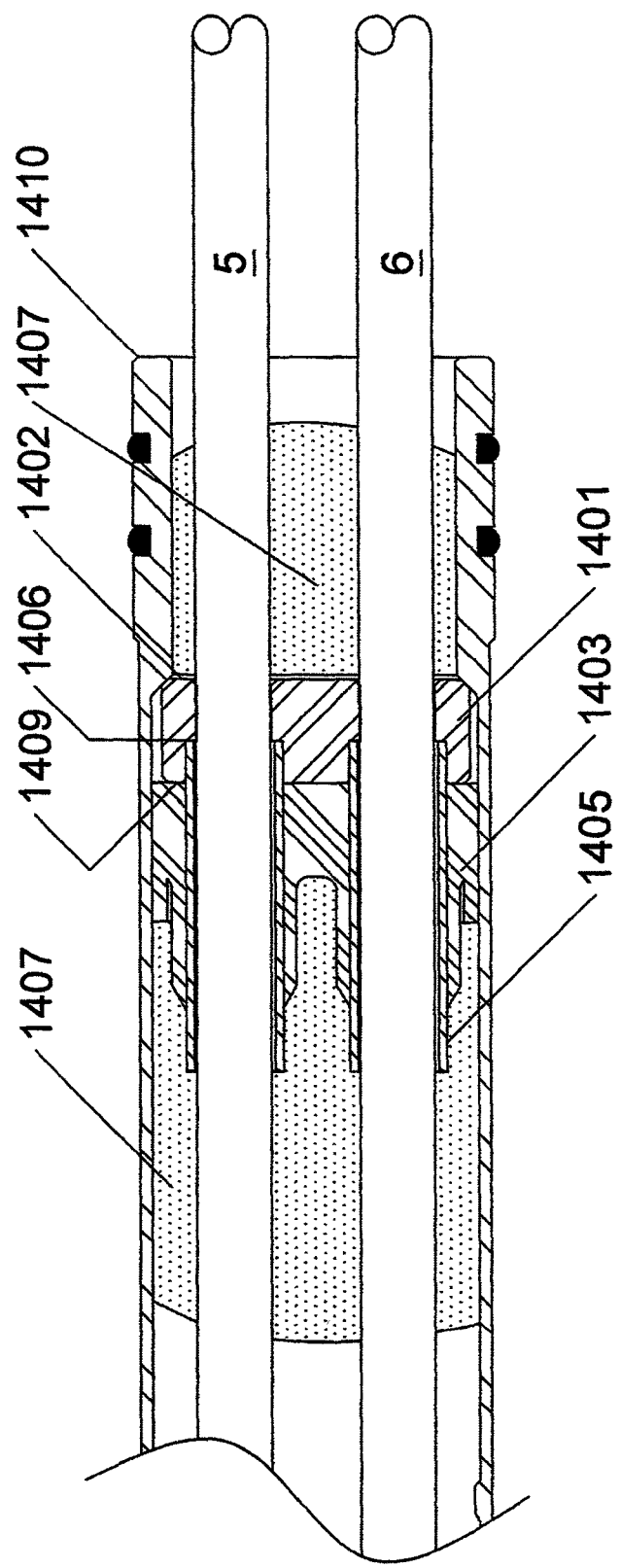
FIG. 9 is another embodiment of the transition seal assembly allowing continuous electrical cables to be sealed within a non-ferromagnetic outer protective sleeve for insertion in a wellhead hanger providing an interior seal seated on an interior shoulder of the non-ferromagnetic protective outer sleeve providing an epoxy seal on both sides of the interior seal.

FIG. 9 is another embodiment of the present invention showing a transition seal body 1401 seated against a shoulder 1402 on an interior surface of a penetrator mandrel 1410. Immediately adjacent the transition seal body 1401 is an elastomeric guide 1403 which holds the stainless steel tubes 1405 and guides them into the transition seal body 1401 providing further seal of the mandrel against vapors and fluids migrating through the electrical cable system. The transition seal body 1401 also provides an interior shoulder 1406 against which seats or abuts the end of a non-ferromagnetic tubing 1405 into which is inserted electrical conductors 5 and 6. In this embodiment, the stainless steel tubing 1405 providing the guides for the electrical conductors 5, 6 are not belled at their end, but could be if desired. Epoxy 1407 is distributed over all the interior of the penetrator mandrel 1410 encapsulating the transition seal body 1401 both above and below the interior shoulder 1402 of the penetrator mandrel 1410.

Other embodiments could be formed by installing more than one transition seal body by providing an epoxy packing between each redundant seal to back up the seal as required by internal pressures and temperatures that may be experienced in the well.

The particular embodiments and use disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

The invention claimed is:

1. A system for a continuous electrical well cable feed-through for a wellhead comprising:
   a non-ferromagnetic mandrel insertable in a wellhead providing a longitudinal passage therethrough and providing an interior shoulder adjacent an upper end of said mandrel;
   a non-ferromagnetic transition seal body, providing at least three foramen permitting passage of a non-terminated electrical conductor through each foramen, inserted into the longitudinal passage of the mandrel seated against the interior shoulder adjacent the upper end of said mandrel wherein the non-ferromagnetic transition seal body provides an interior shoulder within each of the foramen and provides at least three steel tubes for supporting the non-terminated electrical conductors inserted into the non-ferromagnetic transition seal body, each steel tube seated on the interior shoulder in said non-ferromagnetic transition seal body;
   an elastomeric seal providing a plurality of passages permitting the introduction of the non-terminated electrical conductors and the steel tubes covering said electrical conductors;
   epoxy evenly distributed around each steel tubing covering the non-terminated electrical conductor extending from the bottom of the non-ferromagnetic transition seal body to a top of the elastomeric seal within the mandrel;
   epoxy evenly distributed around each steel tubing covering the non-terminated electrical conductor extending from bottom of the elastomeric seal and at least a portion of the non-terminated electrical conductor extending from the steel tubing; and,
   epoxy evenly distributed around each non-terminated electrical conductor extending from a top of the non-ferromagnetic transition seal body to a top of the non-ferromagnetic mandrel.

2. The system for a continuous electrical well cable feed-through for a wellhead of claim 1 wherein each foramen of the non-ferromagnetic transition seal body provides chamfered edges.

3. The system of claim 1 wherein the elastomeric seal is spaced below the non-ferromagnetic transition seal body and the epoxy is distributed between the elastomeric seal and the non-ferromagnetic transition seal body within the non-ferromagnetic mandrel.

4. The system of claim 1 wherein the non-ferromagnetic transition seal body is chamfered to permit insertion into the non-ferromagnetic transition seal body for seating against the interior shoulder of the non-ferromagnetic transition mandrel.

5. A method for installation of a continuous electrical three-phase cable through a wellhead, providing a non-ferromagnetic transition seal body, comprising:
   stripping a protective outer sheath down to an insulation on an electrical conductor of a down-hole three-phase electrical cable;
   inserting each electrical conductor into a non-ferromagnetic tube inserted into each foramen on the non-ferromagnetic transition seal body;
   seating the end of the non-ferromagnetic transition seal body against an interior shoulder in a non-ferromagnetic mandrel;
   distributing epoxy around the insulated electrical conductors on both sides of the non-ferromagnetic transition seal body within the non-ferromagnetic mandrel filling the interior of the mandrel;
   distributing epoxy around the insulated electrical conductors from a top of the non-ferromagnetic transition seal body and a top of the non-ferromagnetic mandrel filling the interior of the mandrel; and,
   inserting the mandrel into a wellhead hanger supported in the wellhead.

* * * * *